Figure 1:
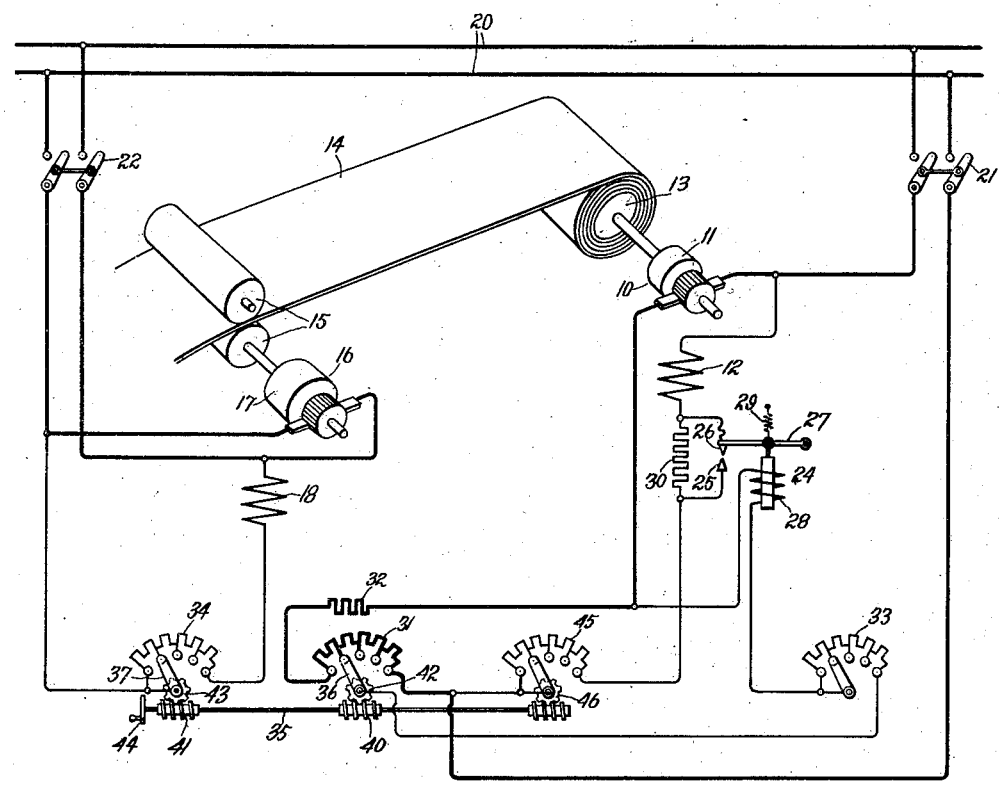

May 9, 1933.  C. B. HUSTON  1,908,250
MOTOR CONTROL SYSTEM
Filed May 7, 1930

Inventor:
Claude B. Huston,
by Charles E. Tullar
His Attorney.

Patented May 9, 1933

1,908,250

UNITED STATES PATENT OFFICE

CLAUDE B. HUSTON, OF SCHENECTADY, NEW YORK, ASSIGNOR TO GENERAL ELECTRIC COMPANY, A CORPORATION OF NEW YORK

MOTOR CONTROL SYSTEM

Application filed May 7, 1930. Serial No. 450,552.

My invention relates to control systems for motors, more particularly to control systems for electric motors employed to drive reels for winding up strip materials, such as cold rolled strip steel, and has for its object the provision of an improved system of control for driving motors of this character whereby a substantially constant preselected tension is maintained in the strip being wound.

In the manufacture of various sheet materials, such as cold rolled strip steel, it is customary to wind the finished product on reels. It is very desirable to maintain a constant tension in the material as it is being wound regardless of the speed at which it is being fed to the reel. In addition to holding constant tension in the material as it is being wound, it is also desirable that it be possible to adjust the value of tension held in the strip for any given setting of the feed rate in order to accommodate different sizes of strip.

In carrying my invention into effect in one form thereof, I provide the reel motor with a control system which includes a regulator responsive to an operating condition of the motor so that the motor will operate to maintain a constant tension in the material as it is being wound. Preferably, I cause the regulator to respond to the potential difference between two points in the armature circuit of the motor so that the current input to the motor is suitably controlled to maintain the constant tension in the strip. The control means further includes suitable means for controlling the potential difference between the two points so that the motor will be controlled to maintain the tension in the material irrespective of the rate at which it is being fed to the reel.

I also provide auxiliary means for changing the setting of the regulator so that the tension maintained in the strip can be adjusted to any suitable value.

For a more complete understanding of my invention reference should be had to the accompanying drawing in which the single figure is a diagrammatic representation of a system of control embodying my invention.

Referring to the drawing, I have shown my invention in one form as applied to a direct current motor employed to drive the collecting reel of a cold rolled strip steel mill. As shown, a direct current motor 10, provided with an armature 11 and a shunt field winding 12, is directly connected to drive a reel 13 which serves to collect and wind in coil form the strip steel 14 passing from the main mill rolls 15. It will be understood, of course, that the motor 10 may be mechanically connected with the reel in any suitable manner other than the direct drive shown in the drawing; thus, a suitable gear train may be interposed between the reel and its driving motor. An adjustable speed electric motor 16, preferably of the direct current type, is provided for driving the main mill rolls 15. As shown, this motor is provided with an armature 17 and a shunt field winding 18. A suitable source of direct current supply 20, preferably of substantially constant potential, is provided for energizing the field and armature members for both motors 10 and 16. It will be understood that these motors may be provided with separate supply sources, however, in the interests of economy the common supply source shown is desirable. A control switch 21 is inserted in the connections leading from the source 20 to the motor 10, while a similar switch 22 is inserted in the connections leading from this source to the motor 16.

As has been pointed out, it is desirable to maintain a certain substantially constant tension in the material 14 between the main mill rolls 15 and the winding reel 13. It will be understood that as long as the lineal speed of the strip remains constant, the power input to the reel motor must be constant in order to maintain a constant tension in the strip. Therefore, in order to maintain a constant tension in the strip under all conditions, the power input to the reel motor must increase or decrease proportionately as the speed of the mill rolls 15 increases or decreases, and further the speed of the reel motor must decrease and its torque increase as the effective diameter of the reel increases by reason of the strip being wound on. It will be evident since the voltage of the supply source 20 is substantially constant, that the current input to the reel motor 10 must vary directly with variations in the speed of the main motor 16 in order that the power input to the motor 10 may vary accordingly; and further for any given constant speed of the motor 16 the current input to the motor 10 must be maintained constant. Furthermore, as the effective diameter of the coil 13 increases, the field strength of the motor 10 must be increased in order to maintain a constant current input to the motor, whereby the torque of the motor is increased so as to maintain the predetermined tension in the strip.

In order that the current input to the reel motor 10 may be so regulated that a predetermined constant tension will be maintained in the strip 14, suitable control means are provided for the motor. The control means comprises a suitable regulator 24, which as shown comprises a stationary contact 25, a movable contact 26 operated by a pivoted bar 27, an operating coil 28 having its core connected to the bar 27 intermediate its ends, and a tension spring 29 connected to the bar preferably at the same point as the core is connected, although this arrangement is not necessary. The regulator contacts 25, 26 are connected across a resistance 30 which is in turn connected in the circuit of the reel motor field winding 12 so that when the contacts are open the resistance is included in the field circuit and when the contacts are closed the resistance is short circuited.

The coil 28 is energized responsively to a suitable motor operating condition, which as I have indicated above, may be the difference in potential between two points in the reel motor armature circuit. As shown, the coil obtains its potential from the resistance drop across a suitable rheostat 31 which is included in series with the armature of the reel motor. This rheostat is adjustable, and at times, as will be pointed out more fully hereinafter, during the process of adjustment its resistance is entirely short circuited. A suitable fixed basic resistance 32 is included in the armature circuit in series with the rheostat 31 so that the winding 28 will receive the potential drop across the resistance 32 at all times even though the rheostat 31 be completely cut out of the operating circuit of the coil 28.

The regulator coil 28 always requires the same amount of current to cause it to balance the spring 29 and consequently, the current in the armature circuit of the motor 10 required to operate the regulator may be controlled by varying the amount of effective resistance of the rheostat 31 across which the coil receives its potential. Thus, the larger the effective combined resistances of the rheostat 31 and the resistance 32 across which the coil is connected, the smaller is the amount of armature current required to produce the necessary voltage drop for obtaining the balancing current for which the regulator is adjusted.

The adjustment of the regulator to obtain the desired value in the tension to be maintained in the strip being wound is effected by means of a suitable adjustable rheostat 33, which as shown is included in series with the regulator coil 28. By increasing the effective resistance of this rheostat, the regulator will cause the reel motor to tend to increase its speed and thereby cause the motor to draw more current in order to produce the proper amount of current to balance the regulator. As a result, a greater tension will be applied to the strip. Conversely, if this effective resistance be decreased the motor will necessarily have to draw less current to produce the proper balancing current in the regulator circuit whereby the tension maintained will be decreased.

It will be understood in view of the foregoing discussion that the strength of the reel motor field 12 and consequently the current intake of the motor 10 will depend upon the relative pulls exerted by the winding 28 upon its core and by the spring 29 on the bar 27. In other words, the strength of the field 12 will depend upon the potential drop across the resistances 31 and 32. The regulator is so adjusted by means of the rheostat 33 that when the current in the reel motor armature is less than a predetermined value to be maintained to give the desired tension in a strip, the pull of the coil 28 will be overbalanced by the tension of the spring 29 and the contacts 25, 26 will be held in their open position, thus inserting the resistance 30 in the circuit of the field 12. The field will then be weakened which will cause more current to flow through the armature 11. It will be understood that since the reel motor speed is fixed by the speed at which the strip is fed to the reel the speed of the reel motor will remain constant notwithstanding its field variations so long as the strip speed remains constant. When the current in the armature 11 increases to a predetermined value above the current to be maintained, the pull exerted by the coil 28 is increased to such a degree that the spring force will be overpowered and the regulator contacts will be closed so as to short circuit the resistance 30 whereby the strength of the field 12 will be increased. As a result, the motor 10 will draw less current from the line until when the armature current is less than the predetermined value, the spring will overpower the pull exerted by the winding 28 and the contacts will be opened to reinsert the resistance in the field circuit. The motor current will now increase and the cycle of operation will be repeated as previously described. The regulator 24 will thus be given a vibratory motion, alternately short circuiting and inserting the resistance 30 in the field circuit of the reel motor 10. As the contacts rapidly vibrate, the effective resistance in the field circuit will depend upon the proportion of time that the contacts are in their open position, and assuming that the motor 16 runs at a constant speed, the vibrator 24 will maintain a constant current input to the motor 10 whereby the motor will apply a constant tension in the strip 14.

Even though the motor 16 runs at a constant speed, the speed of the reel motor 10 must gradually decrease since the effective diameter of the reel 13 gradually increases due to the winding of the strip 14. As the reel diameter increases the reel speed obviously decreases and as a result the motor will tend to apply a torque of such increased value that unless suitably compensated for there would result an increase in the tension in the strip. This action of the motor, however, causes its armature current to increase whereby the regulator operates to close the contacts 25, 26 and thereby strengthen the motor field until the armature current has been reduced to the predetermined value. Thus, since the reel is constantly increasing in diameter, and the armature current always tending to increase, the proportion of time that the vibratory contacts remain closed gradually increases. As a result of this action in maintaining the armature current constant, the effective field resistance will be gradually reduced and the motor field current thereby increased with the result that the motor torque is increased so as to maintain a constant tension in the strip.

In order that the main motor 16, which drives the mill rolls 15 may be operated at various suitable speeds, a suitable rheostat 34 is connected in series with the motor field winding 18, this rheostat serving to control the motor from its basic to its maximum speed. It will be understood that by varying the effective resistance in the circuit of the field winding 18, the speed of the motor 16 and consequently the speed of the strip 14 will be varied accordingly. The current input to the motor 10 must vary proportionately with the changes in speed of the motor 16 and therefore, the response of the regulator 24 must be adjusted accordingly, so that when the speed of the motor 16 is increased to a certain value, the response will be such that a constant current of increased value will be maintained in the armature of the motor 10 whereby the motor will maintain the desired tension in the strip, and conversely when the speed of the motor 16 is decreased to a certain value the response will be such that a constant current of decreased value will be maintained in the armature of the motor 10 so that the motor will still maintain the desired tension in the strip.

I effect this desired control in the response of the regulator automatically and concurrently with changes in the speed setting of the main motor 16. As shown, I have provided an operating connection between the two rheostats 31 and 34, which as shown is a mechanical connection and comprises a suitable shaft 35 arranged to operate the movable elements 36 and 37 provided for the rheostats 31 and 34 respectively. As shown, this shaft is provided with worm gears 40 and 41 which mesh with worm wheels 42 and 43 provided for the movable elements 36 and 37 respectively so that when the shaft is turned, motion will be imparted to each of these movable elements whereby the effective resistances of their associated rheostats will be varied concurrently. The shaft is provided with a suitable hand wheel 44 whereby it may be conveniently operated.

It will be understood that when the main motor field is increased to its maximum strength, the main motor will operate at its minimum or basic speed, and it will be further understood that when the main motor is operated at its minimum speed a current input to the reel motor 10 must be established so that this motor will maintain the desired tension in the strip. Thus for a fixed setting of the tension regulator 33, the vibratory regulator 24 must be so adjusted that when the main motor field 18 is at its maximum strength, the operating coil 28 must receive the potential drop of the maximum effective resistance of the rheostat 31. Under these conditions, as has been explained, the reel motor armature current will be at its minimum value because less armature current is required to produce the proper voltage drop for obtaining the balancing current for which the regulator is adjusted. Conversely, when the strength of the main motor field 18 is at its minimum value the coil should receive the potential drop from the minimum effective resistance of the rheostat 31. This control of the rheostat 31 is effected automatically. It will be observed that when the rheostat 34 is entirely short circuited so that the motor 16 will be caused to run at its minimum or basic speed, the coil 28 will receive the potential drop across the entire resistance of the rheostat 31 whereby, as has been explained, the lower limit of current input for the setting of the tension regulator 33 will be established. As the resistance of the rheostat 34 is inserted in the circuit of the field winding 18 so as to cause the speed of the motor 16 to increase, the effective resistance of the rheostat 31 will be changed concurrently therewith so that the effective resistance across which the coil 28 operates will be reduced whereby the current input to the motor 10 will be increased accordingly. Thus, when the speed of the main motor is increased, the regulator 24 will hold its contacts 25, 26 open for a greater proportion of time thereby increasing the effective resistance in the field circuit of the reel motor so that its current input will increase proportionately with the increase in the speed of the main motor 16. Should the speed of the motor 16 and consequently that of the mill rolls be decreased by the appropriate adjustment of the rheostat 34, the response of the regulator will be controlled so as to decrease the current input to the motor 10 proportionately.

It will be understood that often-times the main mill motor 16 may have a speed ratio as great as 3:1 or more, and that in order to provide sufficient range for winding up the strip 14 at whatever speed the main mill may be set, the motor driving the reel motor may have a speed range as great as 5:1 or more. Thus for example, assuming that the main mill has a speed ratio of 3:1 and that the ratio of change in the diameter of the strip be approximately 1.66, it will be clear that the reel motor must have a speed range of 3 times 1.66:1 or approximately 5:1. It is generally not desirable to impose upon the regulator 24 the work of regulating over such a large range of speed. In order to reduce the work imposed upon the regulator 24, a suitable adjustable rheostat 45 is inserted in the circuit of the reel motor field 12. This rheostat may be adjusted to take care of either all or a part of the changes of speed in the reel motor due to the changes in speed of the motor 16. Preferably and as shown, this rheostat is mechanically connected with the shaft 35 through a suitable worm gear drive 46 so that as the operator varies the resistance in the field of the main motor 16, the resistance in the field of the reel motor 10 will be automatically and proportionately varied. Thus, with this arrangement, the rheostat 45 will automatically tend to adjust the speed of the reel motor as the speed of the main mill is adjusted. It is to be understood, however, that the rheostat 45 is provided merely to reduce the work imposed upon the regulator, and that the regulator may wholly perform the function of gradually varying the current input to the motor 10 according to variations in the speed of the strip 14, as well as maintaining constant tension with a fixed speed of the strip. I have found that with my system of control that very close regulation of the reel motor is obtained, even though the speed range of the mill and consequently of the reel motor is very large.

In operation, it will be understood that the main motor 16 drives the mill rolls 15 at any suitable constant speed and that the reel motor 10 operates to maintain a certain preselected tension in the strip 14, the current input to the motor 10 being suitably controlled by the regulator 24. The regulator 24 further controls the current input to the motor 10 by gradually decreasing its speed as the effective diameter of the reel gradually increases so that the torque delivered by the reel motor 10 will gradually increase. When the motor 16 is adjusted to run at higher or lower speeds, the regulator 24 will automatically adjust the effective resistance in the field circuit of the motor 10 so that the current input to the motor 10 will be increased or decreased accordingly, whereby regardless of the speed of the mill, the desired predetermined tension will be constantly maintained in the strip 14.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. The combination with a winding reel for a strip of material to be wound thereon of a driving motor for said reel, means for feeding said strip to said reel, means for adjusting the feed of said strip to said reel, means responsive to a condition of operation of said reel motor for controlling said reel motor to maintain a tension in said strip, means responsive to the operation of said adjusting means in controlling the feed of said strip for controlling the response of said reel motor controlling means so that said motor maintains said tension irrespective of the setting of said feed adjusting means and auxiliary means for controlling said tension controlling means so that the value of the tension maintained in said strip can be adjusted.

2. The combination with a winding reel for a strip of material to be wound thereon of a motor for driving said reel, means for feeding said strip to said reel, means for controlling said feeding means so as to adjust the feed of said strip, means responsive to an electrical condition of said reel motor for controlling said motor to maintain a tension in said strip, means responsive to the operation of said feed-controlling means in adjusting the feed of said strip for controlling the response of said tension controlling means so that the motor maintains said tension irrespective of the setting of said feed adjusting means and auxiliary means for controlling said tension controlling means so that the value of the tension maintained in said strip can be adjusted.

3. The combination with a winding reel for a strip of material to be wound thereon of means for feeding said strip to said reel, means for adjusting said feeding means so as to control the feed of said strip, a driving motor for said reel, a source of electrical supply for said reel motor having a substantially constant potential irrespective of the feed of said strip to said reel, means responsive to the operation of said feed adjusting means in controlling the feed of said strip and the reel motor armature current for controlling said reel motor so as to vary the current input thereto proportionately with the rate of feed of said strip and auxiliary means for adjusting said reel motor controlling means so that the value of the tension maintained in said strip can be regulated.

4. The combination with a winding reel for a strip of material to be wound thereon of means for delivering said material to said reel, a motor for driving said reel, means associated with the armature circuit of said motor for effecting a potential difference between two points in said circuit, means responsive to said potential difference for controlling said motor to maintain a tension in said strip and means operably associated with said potential difference effecting means and said tension controlling means for adjusting the effective value of said potential difference applied to control said tension controlling means.

5. The combination with a winding reel for a strip of material to be wound thereon of means for delivering said material to said reel, a motor for driving said reel, a resistance connected in the armature circuit of said motor, means responsive to the potential difference effected by said resistance for controlling said motor to maintain a tension in said strip, means for adjusting the effective value of said resistance so that said motor is controlled to maintain said tension for different feeds of said strip to said reel and auxiliary means for controlling said tension controlling means so that the tension maintained in said strip can be adjusted.

6. The combination with a winding reel for a strip of material to be wound thereon of means for delivering said material to said reel, means for controlling said delivering means so that the feed of said strip can be adjusted, a motor for driving said reel, means dependent upon the difference in potential between two points in the armature circuit of said motor for controlling said motor to maintain a tension in said strip and means responsive to the operation of said feed controlling means in adjusting the feed of said strip for adjusting the value of said potential drop.

7. The combination with a winding reel for a strip of material to be wound thereon of means for delivering said material to said reel, means for controlling said delivering means so that the feed of said strip can be adjusted, a motor for driving said reel, means dependent upon the difference in potential between two points in the armature circuit of said motor for controlling said motor to maintain a tension in said strip, means operably associated with said feed controlling means for regulating the response of said tension controlling means concurrently with changes in the feed adjustment of said strip and auxiliary means for changing the response of said tension controlling means so as to change the value of the tension maintained in said strip.

8. The combination with a winding reel for a strip of material to be wound thereon of a driving motor for said reel, a resistance connected in the armature circuit of said motor, a resistance adapted to be inserted in the circuit of the field winding of said motor, vibratory control means for said second resistance whereby said resistance is periodically inserted in the field circuit of said motor, said vibratory control means having an operating winding responsive to the potential drop effected by said first resistance, means for controlling the feed of said strip to said reel and means for controlling the response of said winding to said potential drop so that said reel motor is regulated to maintain a tension in said strip irrespective of the feed of said strip.

9. The combination with a winding reel for a strip of material to be wound thereon of a motor for driving said reel, means for feeding said strip to said reel, means for controlling said feeding means so that the feed of said strip can be adjusted, and a current controlling regulator for said reel motor including an operating coil, a resistance connected in the reel motor armature circuit for controlling the electromotive force supplied to said operating coil and adjusting means for said resistance, and means for effecting concurrent adjustment of said feed controlling means and of said resistance adjusting means.

10. The combination with a winding reel for a strip of material to be wound thereon of a motor for delivering said material to said reel, means for controlling the speed of said delivery motor, means operably associated with said speed controlling means for varying the speed setting of said reel motor concurrently with adjustments in the speed of said delivery motor and means responsive to the current input to said reel motor and the operation of said speed controlling means in adjusting said delivery motor for controlling said reel motor so as to maintain a tension in said strip irrespective of the speed of said strip to said reel.

11. The combination with a winding reel for a strip of material to be wound thereon of an electric motor for delivering said material to said reel, means for controlling the speed of said delivery motor, a second motor for operating said winding reel, a resistance adapted to be inserted in the field circuit of said reel motor, and means for regulating the insertion of said resistance whereby the field strength of said reel motor is varied to vary the current input thereto directly with the speed of said delivery motor, said regulating means comprising a pair of electrical contacts shunted about said resistance, said contacts when opened inserting said resistance in the field circuit of said reel motor and when closed bypassing said resistance, a rheostat in the armature circuit of said reel motor, an operating coil responsive to the potential drop across said rheostat for closing said contacts, resilient means opposing the closing of said contacts and means for changing the effective resistance of said rheostat as the speed of said delivery motor is changed.

In witness whereof, I have hereunto set my hand this 6th day of May, 1930.

CLAUDE B. HUSTON.